(12) United States Patent
Bhatia et al.

(10) Patent No.: US 10,647,228 B2
(45) Date of Patent: May 12, 2020

(54) PROTECTIVE SEAT LOAD FLOOR FOR HYBRID VEHICLES

(71) Applicant: TOYOTA MOTOR ENGINEERING & MANUFACTURING NORTH AMERICA, INC., Erlanger, KY (US)

(72) Inventors: Vikas Bhatia, South Lyon, MI (US); Luke A. McKean, Ann Arbor, MI (US); Peter J. Moegling, Whitmore Lake, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 219 days.

(21) Appl. No.: 15/885,334

(22) Filed: Jan. 31, 2018

(65) Prior Publication Data

US 2019/0232832 A1     Aug. 1, 2019

(51) Int. Cl.
*B60N 2/42* (2006.01)
*B60K 1/04* (2019.01)
*H01M 2/10* (2006.01)

(52) U.S. Cl.
CPC .............. *B60N 2/4263* (2013.01); *B60K 1/04* (2013.01); *H01M 2/1083* (2013.01); *B60K 2001/0422* (2013.01); *B60K 2001/0433* (2013.01); *B60K 2001/0438* (2013.01)

(58) Field of Classification Search
CPC ..... H01M 2/1083; B60N 2/4263; B60K 1/04; B60K 2001/0422; B60K 2001/0433; B60K 2001/0438
See application file for complete search history.

(56) References Cited

U.S. PATENT DOCUMENTS

| | | | |
|---|---|---|---|
| 8,393,426 B2 | 3/2013 | Takahashi et al. | |
| 8,776,927 B2 | 7/2014 | Akazawa et al. | |
| 9,016,778 B2* | 4/2015 | Hellman | A47C 4/54 297/188.09 |
| 9,321,338 B2 | 4/2016 | Naruke | |
| 9,506,255 B1* | 11/2016 | Jones | E01C 9/086 |
| 10,232,788 B1* | 3/2019 | Hagedorn | B60N 2/90 |
| 2002/0005649 A1* | 1/2002 | Hofmann | B60R 7/043 296/37.15 |
| 2004/0100114 A1* | 5/2004 | Rhodes | B60N 2/062 296/65.09 |
| 2004/0100116 A1* | 5/2004 | Rhodes | B60N 2/062 296/66 |
| 2005/0056472 A1* | 3/2005 | Smith | B60H 1/00278 180/68.1 |
| 2011/0262801 A1* | 10/2011 | Schwab | B60K 1/04 429/163 |

(Continued)

FOREIGN PATENT DOCUMENTS

| | | |
|---|---|---|
| FR | 2990386 A1 | 11/2013 |
| FR | 2997907 A1 | 5/2014 |
| WO | WO 201276791 A1 | 6/2012 |

*Primary Examiner* — Lori L Lyjak
(74) *Attorney, Agent, or Firm* — Oblon, McClelland, Maier & Neustadt, L.L.P.

(57) ABSTRACT

A vehicle seating apparatus includes a structural tub and a protective seat load floor wherein the protective seat load floor includes an anti-submarining feature. The apparatus can also be disposed on top of the structural tub housing a battery for an electrified vehicle, wherein the seat load floor serves as the battery cover.

19 Claims, 5 Drawing Sheets

(56) References Cited

U.S. PATENT DOCUMENTS

2014/0154460 A1\* 6/2014 Preisler .................... B32B 5/18
    428/116
2017/0267131 A1\* 9/2017 Neighbors ........... B60N 2/3075
2018/0215318 A1\* 8/2018 Abdel Majid ......... B60N 2/933

\* cited by examiner

PROTECTIVE SEAT LOAD FLOOR FOR HYBRID VEHICLES

FIELD OF THE DISCLOSURE

This specification relates generally to an anti-submarining feature incorporated into a protective seat load floor for automobiles.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

During a frontal automobile collision or sudden braking event, rapid deceleration can cause occupants to undergo what is known as "submarining," or the tendency for occupants to slide partially underneath the portion of the seat belt running across the lap.

SUMMARY

To help prevent this phenomenon from occurring, an anti-submarining feature can be integrated into the automobile seat. Some features currently employed include a crossbar installed transverse to the seat frame inside or below the seat cushions. While this feature may help prevent a forward sliding motion when the occupant sinks into the seat and the bar pushes against the occupant's upper leg, the small cross-sectional area of the transverse crossbar means the force exerted on the occupant is high and concentrated.

In addition, considerable force is exerted downwards by the occupant during a frontal collision. In the event that components are stored below the occupant, for example a battery assembly, the seat must be able to support the occupant and withstand the added stresses during the frontal collision. Thus, a seat load floor with an integrated feature that prevents submarining and more evenly distributes forces on an occupant during a collision is needed.

The foregoing paragraphs have been provided by way of general introduction, and are not intended to limit the scope of the following claims. The described embodiments, together with further advantages, will be best understood by reference to the following detailed description taken in conjunction with the accompanying drawings.

According to various aspects of the disclosed subject matter, a vehicle seating apparatus is presented. The apparatus includes a structural tub and a protective seat load floor wherein the protective seat load floor includes an anti-submarining feature. The apparatus can also be disposed on top of the structural tub housing a battery for an electrified vehicle, wherein the seat load floor serves as the battery cover.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It is to be understood that terms such as "front," "back," "right," "left," "side," "top," and the like that may be used herein merely describe points of reference and do not necessarily limit embodiments of the present disclosure to any particular orientation or configuration.

The present disclosure relates to a feature that can decrease the likelihood of submarining during a frontal automobile collision by resisting a forward (i.e. towards the front) sliding motion of the occupant's upper leg and pelvis and therefore securing the occupant in a more upright position firmly in a vehicle seat. Moreover, the feature is integrated into a seat load floor with a large area, allowing forces felt by the occupant during a collision to be spread evenly over the entire surface of the seat load floor. The seat load floor also serves a dual purpose as the top protective housing for the battery, thereby saving time and resources in making a separate cover. In addition, the anti-submarining feature can be utilized in combination with other common safety features for greater effect, such as seat belt pre-tensioners and/or seat belt force-limiters.

Figure 1:
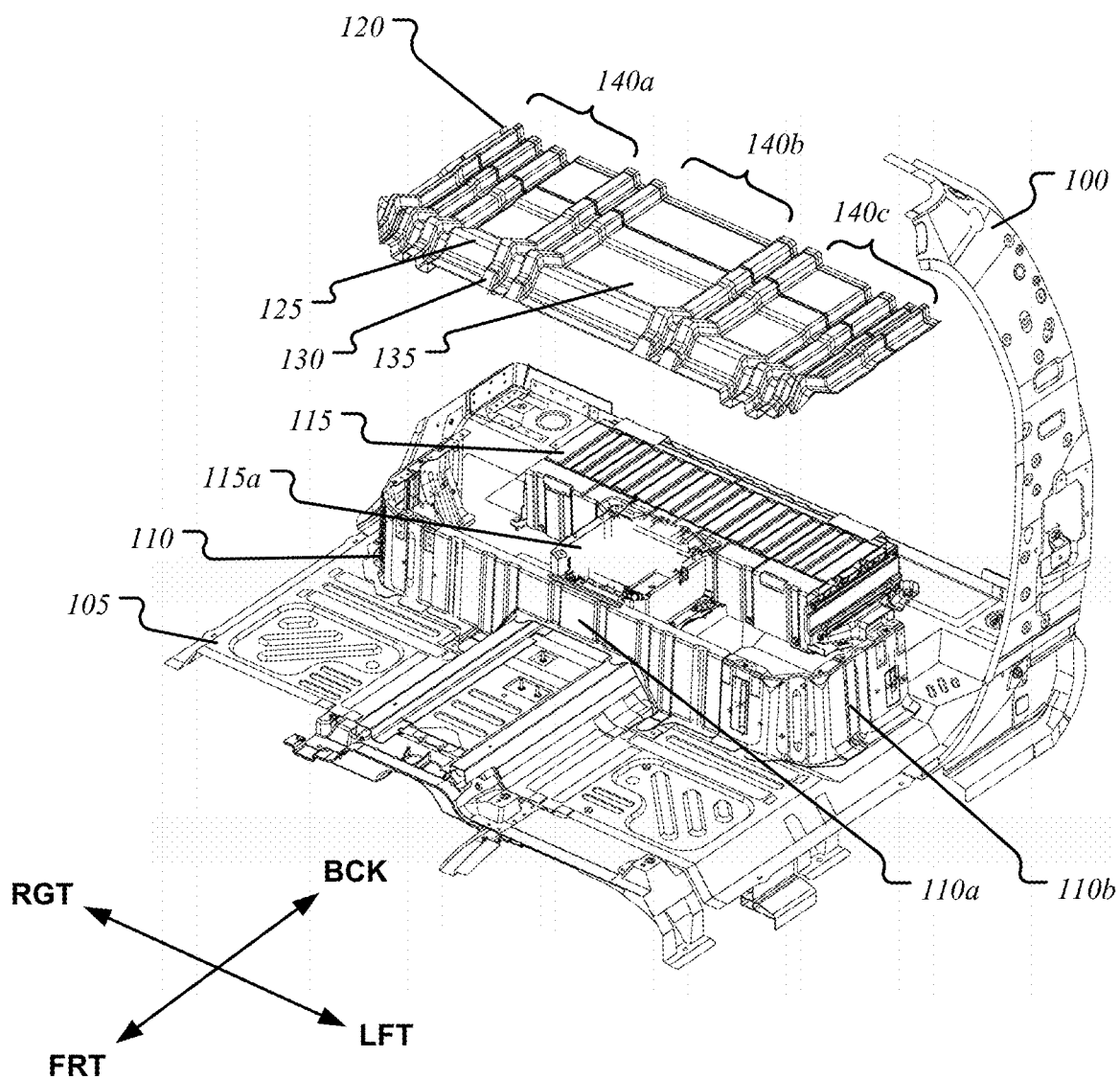
FIG. 1 is an isometric view of a vehicle that includes an upper body frame, an underbody, a structural tub, a battery, and a protective seat load floor where the protective seat load floor is not secured to the structural tub according to one or more aspects of the disclosed subject matter.
Figure 2:
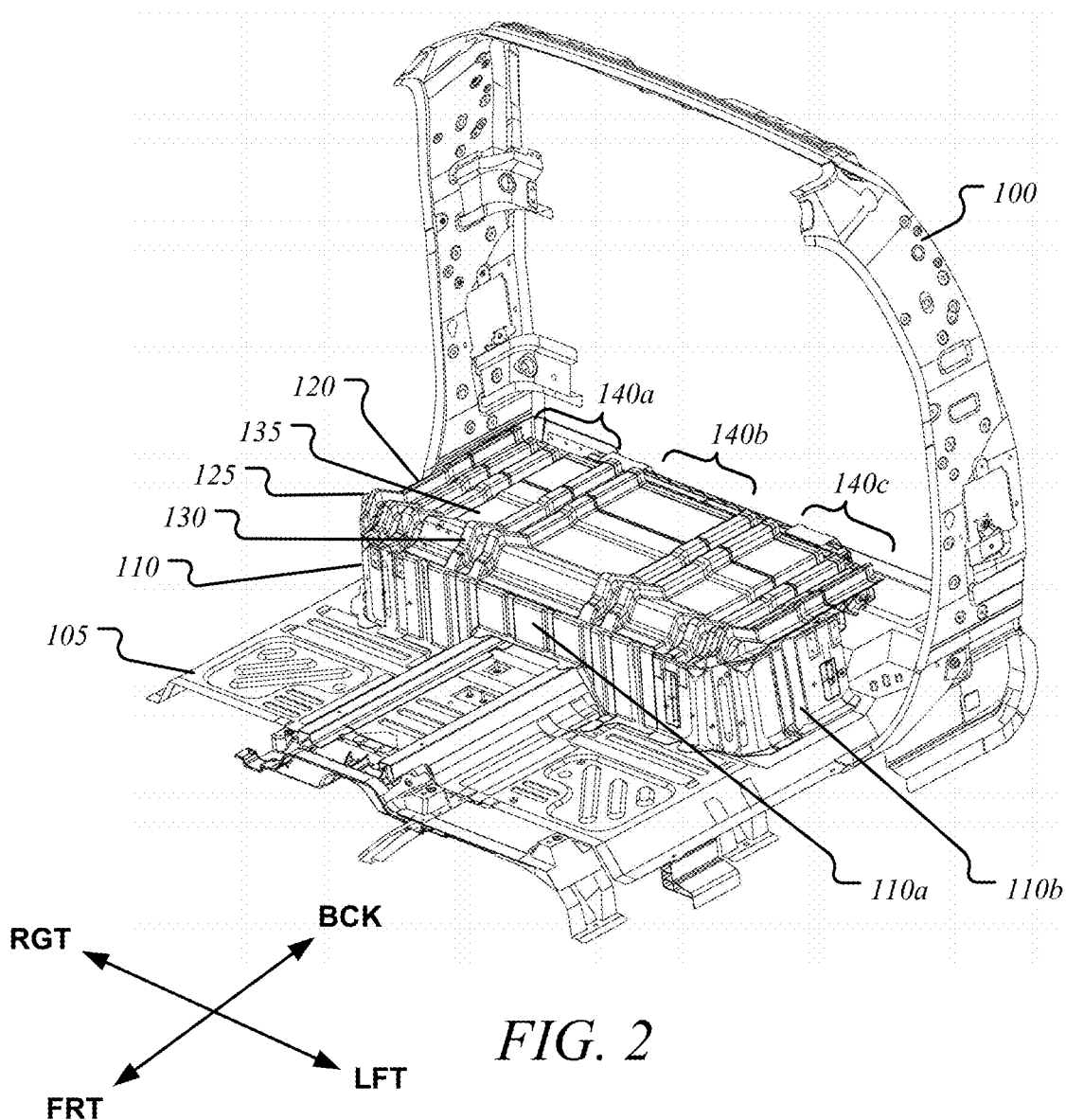
FIG. 2 is an isometricview of a vehicle that includes an upper body frame, an underbody, a structural tub, a battery, and a protective seat load floor where the protective seat load floor is secured to the structural tub according to one or more aspects of the disclosed subject matter.
Figure 3:
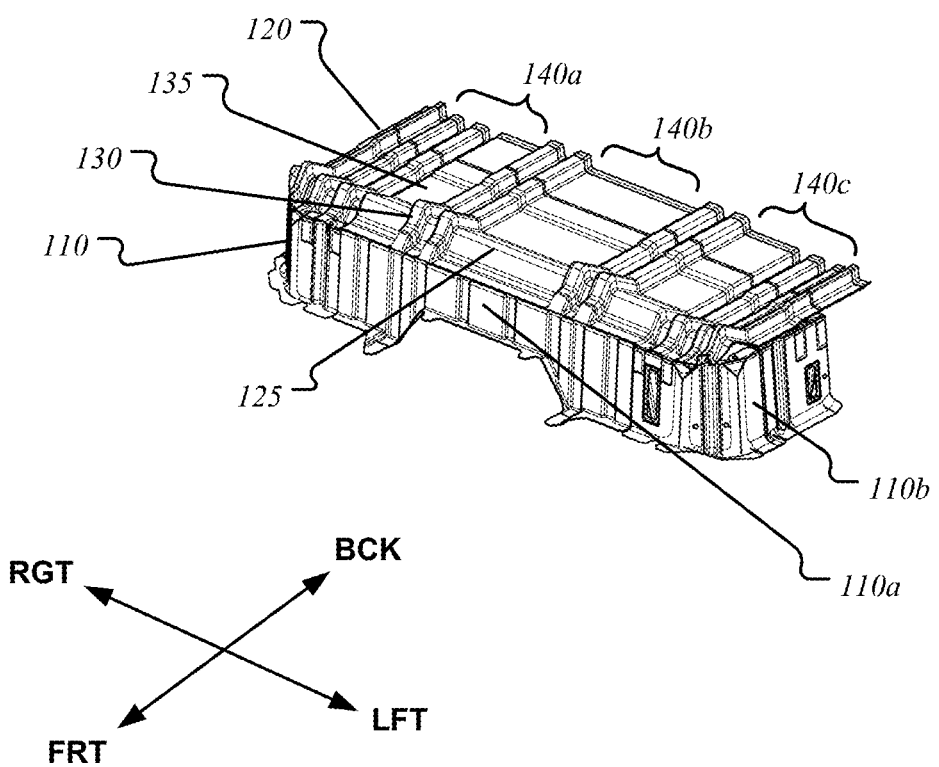
FIG. 3 is an isometric view of a structural tub and a protective seat load floor where the protective seat load floor is secured to the structural tub according to one or more aspects of the disclosed subject matter.

A typical vehicle body including an upper body frame 100 and an underbody 105 is illustrated in FIGS. 1-3, along with a legend to identify vehicle orientation in terms of the front (FRT), back (BCK), left (LFT), and right (RGT) directions. In an exemplary embodiment, a plurality of interior structural elements can be attached to the underbody 105, such as a structural tub 110 for a rear seat. The structural tub 110 can include a vertical front wall 110a running transverse to the vehicle body (i.e. left to right) and at least one vertical side wall 110b, preferably two vertical side walls 110b, disposed on right-most and left-most ends of the front wall 110a. The structural tub 110 can include a plurality of holes machined at predetermined locations in order to allow fastening of other parts to the top of the structural tub 110. Non-limiting examples of an appropriate material for the seat floor 120 are high strength steel, aluminum, carbon fiber epoxy composite, resin, and glass reinforced resin.

The structural tub 110 can also house a high voltage battery assembly 115 (herein referred to as the battery 115) that can be attached to the underbody 105. The battery 115 can be disposed towards the back of the structural tub 110 and adjacent to the trunk space of the vehicle (not shown). The battery 115 can include a plurality of rechargeable cells, for example lithium ion cells, that power the vehicle. Additionally, a plurality of other battery components 115a used for normal battery 115 operations can be housed in the structural tub 110 and disposed in front of the battery 115. The battery components 115a can include, for example, high voltage wires.

In an exemplary embodiment, the battery 115 can have a height such that the top of the battery 115 is level with or nearly close to being level with the top of the structural tub 110. This can allow a relatively flat structure to rest on top the structural tub 110 and battery 115, such as a protective seat load floor 120 (herein referred to as seat floor 120) as illustrated above the aforementioned components in FIGS. 1-3. The seat floor 120 can therefore also act as both the protective cover for the battery 115 and the support structure for occupants.

The seat floor 120 can be of a hexagonal shape with a first long back edge and a second long front-facing edge having two corners that can be rounded or cut at an angle, for example a 45 degree angle, in order to closely match the shape of the structural tub 110 below. The seat floor 120 can be fabricated using a stamping method, such as metal stamping, wherein multiple features are incorporated into a mold and transferred during the stamping process. This method, in turn, can reduce fabrication steps, use less material, and reduce material waste. The seat floor 120 can be installed by securing it to the structural tub 110 using, for example, bolts, screws, or clips. The design, material choice, and manufacturing method for the seat floor 120 can allow the seat floor 120 to be lightweight, a single piece, and facile to install by humans or robots compared to, for example, a metal structural bracket apparatus with multiple pieces that is required to secure the battery 115.

A non-limiting example of an exemplary material for the seat floor 120 is SPC980 steel. The width of the seat floor 120 can be, for example, 800 mm to 1500 mm, or preferably, 1288.5 mm. The maximum profile height of the seat floor 120 can be, for example, 40 mm to 100 mm, or preferably, 61 mm. The thickness of the seat floor 120 material can be, for example, 0.5 mm to 10 mm, or preferably, 1 mm.

Figure 4A:
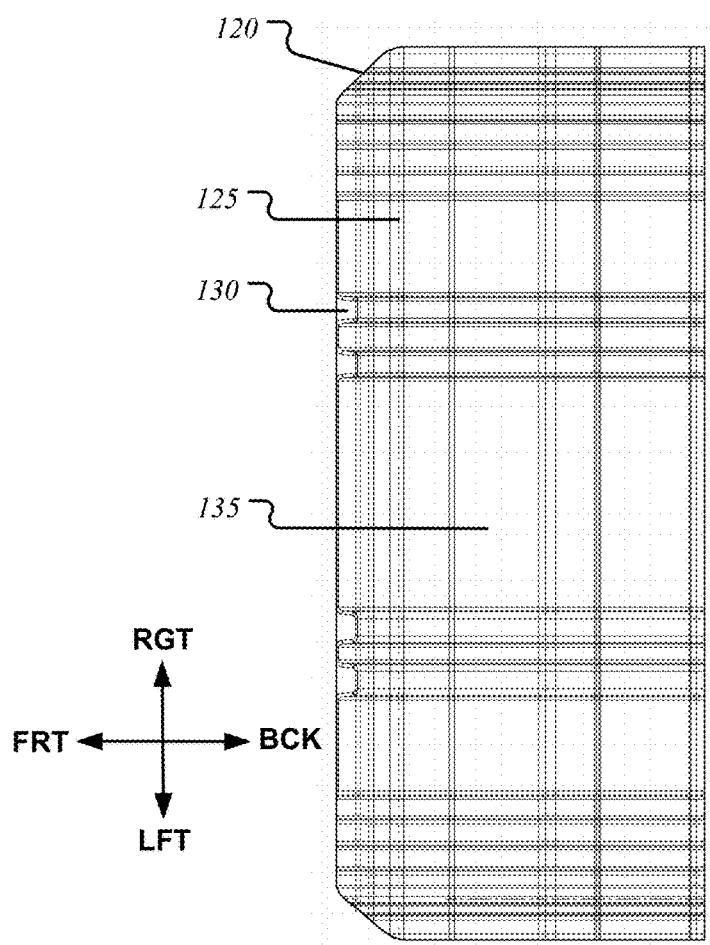
FIG. 4A is a top-down view of a protective seat load floor according to one or more aspects of the disclosed subject matter.
Figure 4B:
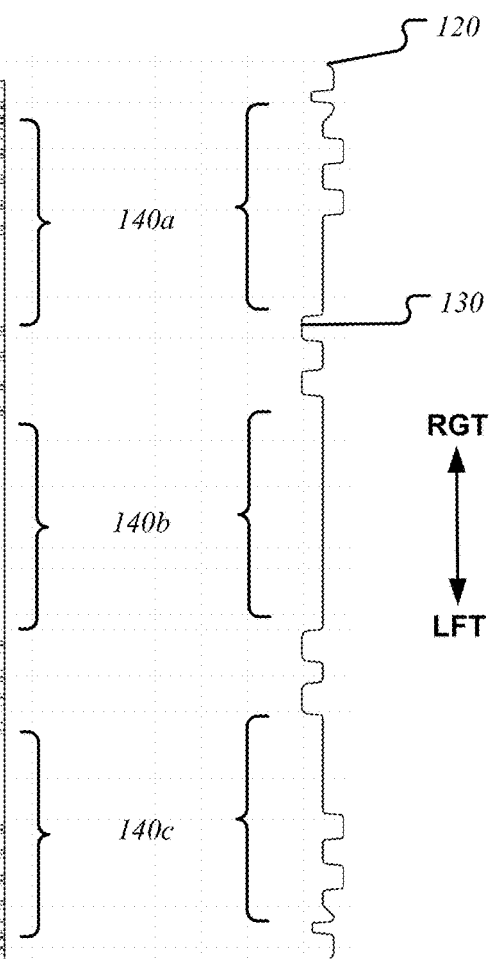
FIG. 4B is a side-view cross-section of a protective seat load floor according to one or more aspects of the disclosed subject matter.

The seat floor 120 can include an integrated anti-submarining feature 125 laterally spanning (i.e. from left to right) the seat floor 120 and disposed towards the front-facing long edge of the seat floor 120. Integrating the anti-submarining feature into the seat floor 120 eliminates the need for a separate anti-submarining feature, for example an anti-submarining bar as part of a metal structural bracket apparatus, and thus reduces material requirements and overall structure mass. FIG. 4A illustrates a top-down view of the seat floor 120 and FIG. 4B illustrates a side-view cross-section from the left-hand side. As seen in FIG. 4B, the anti-submarining feature 125 can be a raised shape, for example a triangular or curved wedge, which resists back-to-front sliding movement. The height of the anti-submarining feature 125 can be, for example, 10 mm to 100 mm, or preferably, 60 mm. During a frontal collision, the upper leg and pelvis of the occupant can slide forward along the seat floor 120 and encounter the anti-submarining feature 125, where the upper leg can then press against the anti-submarining feature 125, preventing it from sliding forward further. If the occupant is wearing a seat belt, this can prevent the occupant from sliding under the seat belt and can keep the ventral portion of the seat belt more centrally disposed above the occupant's pelvis. Moreover, the seat floor 120 and anti-submarining feature 125 can provide a greater surface area, for example compared to a thin anti-submarining bar, over which the occupant's downward forces (due to rapid deceleration) are distributed during a frontal collision.

The seat floor 120 can also include one or more structures, for example one or more corrugated features 130 (herein referred to as corrugated features 130) and recessed zone 135 that increase the seat floor 120 strength. The corrugated features 130 can run in a front-to-back direction along the seat floor 120, intersect the anti-submarining feature 125, and be raised above or depressed below a plane of the seat floor 120 (where unimpeded by the battery 115). The corrugated features 130 can follow the contours of the seat floor 120 while maintaining its shape relative to the seat floor 120. As illustrated in FIGS. 1-4, there can be a first set of depressed corrugated features 130 along the right side of a first outboard seat 140a, followed by a set of raised corrugated features 130 that separate the first outboard seat 140a and an inboard seat 140b, followed by another set of raised corrugated features 130 that separate the inboard seat 140b and a second outboard seat 140c, and then a final set of depressed corrugated features 130 along the left side of the second outboard seat 140c. Together, the corrugated features 130 and the recessed zone 135 importantly serve to protect the underlying battery 115 from downward forces exerted by the occupant in a frontal collision.

Figure 4C:
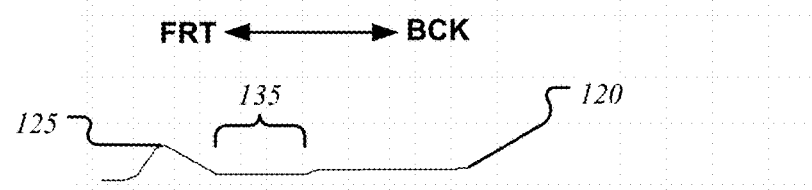
FIG. 4C is a back-view cross-section of a protective seat load floor according to one or more aspects of the disclosed subject matter.

FIG. 4C illustrates a back-view cross-section of FIG. 4A. As seen in FIG. 4C, the corrugated features 130 can adopt myriad pre-determined cross-sectional shapes, for example triangular, rectangular, or curved, while still providing increased strength to the seat floor 120. The height of the corrugated features 130 can be, for example, 10 mm to 60 mm, or preferably, 31 mm.

The recessed zone 135 can be a laterally spanning section of the seat floor 120 that is disposed between the anti-submarining feature 125 and the second long edge, and is depressed below the plane of the seat floor. In a front-to-back direction, the recessed zone 135 can extend from behind the anti-submarining feature 125 to the battery 115, where it elevates to a height where the remainder of the seat floor 120 can be disposed such that it covers the battery 115. The recessed zone 135 can be flat or adopt an upward opening concave shape (when viewed from the side cross-sectional profile) in order to maximize occupant comfort or increase the effectiveness of the anti-submarining feature 125. The depression depth of the recessed zone 135 can be, for example in the case of a flat profile, 0.5 to 50 mm, or preferably, 10 mm.

Figure 5:
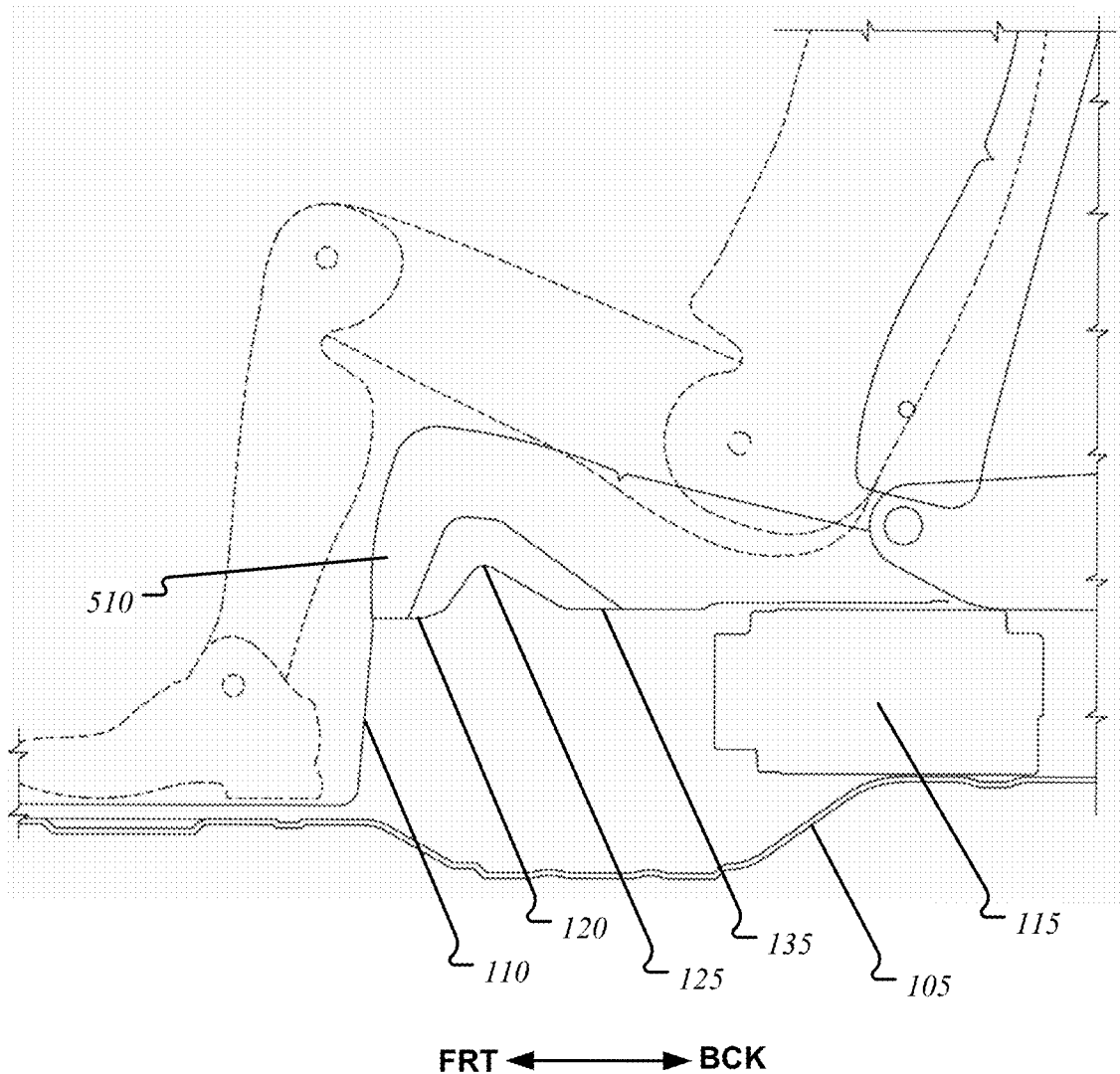
FIG. 5 is a side-view cross-section of a passenger sitting in a vehicle seating apparatus that includes an a structural tub, a battery, a seat cushion, and a protective seat load floor according to one or more aspects of the disclosed subject matter.

The corrugated features 130 can also serve as a location index during the installation of a seat cushion, as illustrated in FIGS. 1-4. Both the raised and depressed corrugated features 130 provide easily identifiable features that can be correlated to corresponding features on the underside of the seat cushion 510 in FIG. 5. This can allow for faster and more consistent installation of the seat cushion 510 by an operator during manufacturing.

The corrugated features 130 and recessed zone 135 can also improve passenger comfort when the seat cushion 510 is installed on top of the seat floor 115. The depressed sections of corrugated features 130 and recessed zone 135 can allow for more overall seat cushion 510 material to be used to fill the vacancies and thus improve passenger comfort.

According to an alternative embodiment, the vehicle can be of a smaller size such that the rear seat is narrower (and thereby the rear seat tub 110) and only allows for a maximum of two passengers to sit on the seat floor 120. In this embodiment, the seat floor 120 can include a first outboard seat 140a and a second outboard seat 140c and not include an inboard seat 140b. The seat floor 120 can include the lateral anti-submarining feature 125 close to its long front-facing edge, as well as corrugated features 130 and recessed zone 135. The one or more depressed corrugated features 130 can be disposed along the left and right edges of the seat floor 120 and the one or more raised corrugated features 130 can be disposed in the middle of the seat floor 120 such that the one or more raised corrugated features 130 separate the first and second outboard seats 140a, 140c.

Advantages according to the prior exemplary embodiment are retained and summarized again. The advantages include facile fabrication and installation of the lightweight seat floor 120 via a stamping process, decreased forward sliding motion, and decreased pressure on the upper leg and pelvis during a frontal collision via the anti-submarining feature 125 and seat floor 120, location indexing for the seat cushion 510 during manufacturing via the corrugated features 130, and increased strength and improved passenger comfort via both the corrugated features 130 and recessed zone 135.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure.

What is claimed is:

1. A vehicle seating component, comprising:
a seat load floor including a first edge and a second edge, wherein the first edge is disposed towards a front end of a vehicle and the second edge is disposed towards a back end of the vehicle; and
a raised portion of the seat load floor adjacent to and along the first edge and configured to impede a movement of an object towards the front end of the vehicle.

2. The vehicle seating component of claim 1, further comprising:
one or more corrugated features intersecting the raised portion and disposed between the first edge and the second edge, wherein the one or more corrugated features are raised above or depressed below a plane of the seat load floor.

3. The vehicle seating component of claim 2, wherein the one or more corrugated features follow the contour of the seat load floor while maintaining a shape of the one or more corrugated features relative to the seat load floor.

4. The vehicle seating component of claim 2, wherein the component includes a first set of two depressed corrugated features along a first outer edge of a first outboard seat, a second set of two raised corrugated features separating the first outboard seat and an inboard seat, a third set of two raised corrugated features separating the inboard seat and a second outboard seat, and a fourth set of two depressed corrugated features along a second outer edge of the second outboard seat.

5. The vehicle seating component of claim 1, further comprising:
a recessed zone that is disposed between the raised portion and the second edge and is depressed below a plane of the seat load floor.

6. The vehicle seating component of claim 2, further comprising:
a recessed zone that is disposed between the raised portion and the second edge and is depressed below a plane of the seat load floor.

7. The vehicle seating component of claim 1, wherein a material of the component includes at least one of high strength steel, aluminum, carbon fiber epoxy composite, resin, and glass reinforced resin.

8. A vehicle seating apparatus, comprising:
a structural tub including a vertical wall, a first side wall disposed on a first end of the vertical wall, and a second side wall disposed on a second opposite end of the vertical wall, wherein the structural tub is configured to secure a battery during vehicle movement and to support a structure secured to the top of the structural tub; and
a vehicle seating component including
a seat load floor including a first edge and a second edge, wherein the first edge is disposed towards a front end of a vehicle and the second edge is disposed towards a back end of the vehicle, and
a raised portion of the seat load floor adjacent to and along the first long edge and configured to impede a movement of an object towards the front end of the vehicle.

9. The vehicle seating apparatus of claim 8, wherein the vehicle seating component includes
one or more corrugated features intersecting the raised portion and disposed between the first edge and the second edge, wherein the one or more corrugated features are raised above or depressed below a plane of the seat load floor.

10. The vehicle seating apparatus of claim 8, wherein the vehicle seating component includes
a recessed zone that is disposed between the raised portion and the second edge and is depressed below a plane of the seat load floor.

11. The vehicle seating apparatus of claim 9, wherein the vehicle seating component includes
a recessed zone disposed between the raised portion and the second edge and is depressed below a plane of the seat load floor.

12. The vehicle seating apparatus of claim 8, wherein a material of the vehicle seating component includes at least one of high strength steel, aluminum, carbon fiber epoxy composite, resin, and glass reinforced resin.

13. The vehicle seating apparatus of claim 8, wherein the vehicle seating component includes
a first set of two depressed corrugated features along a first outer edge of a first outboard seat, a second set of two raised corrugated features separating the first outboard seat and an inboard seat, a third set of two raised corrugated features separating the inboard seat and a second outboard seat, and a fourth set of two depressed corrugated features along a second outer edge of the second outboard seat.

14. The vehicle seating apparatus of claim 8, wherein the vehicle seating component is configured to support a downward force exerted by an object disposed above the vehicle seating component during a vehicle collision or rapid deceleration.

15. The vehicle seating apparatus of claim 8, wherein the vehicle seating component is configured to be implemented in a vehicle in conjunction with a safety belt.

16. The vehicle seating apparatus of claim 8, wherein the vehicle seating component is fabricated using a stamping method.

17. The vehicle seating apparatus of claim 8, wherein the vehicle seating component is fabricated using a molding process.

18. The vehicle seating apparatus of claim 8, wherein the vehicle seating component is secured to the structural tub using bolts, screws, or clips.

19. The vehicle seating apparatus of claim 8, wherein the vehicle seating component includes a first outboard seat, a second outboard seat, and does not include an inboard seat.

\* \* \* \* \*